(12) United States Patent
Tagawa

(10) Patent No.: US 6,462,323 B1
(45) Date of Patent: Oct. 8, 2002

(54) TILT DETECTOR AND TILT DETECTION METHOD IN THE RADIAL AND TANGENTIAL DIRECTIONS

(75) Inventor: Yukihiro Tagawa, Yokohama (JP)

(73) Assignee: Samsung Electro-Mechanics Co., Ltd., Kyunggi-Do (KR)

( * ) Notice: Subject to any disclaimer, the term of this patent is extended or adjusted under 35 U.S.C. 154(b) by 19 days.

(21) Appl. No.: 09/821,744

(22) Filed: Mar. 30, 2001

(51) Int. Cl.[7] .................. G02B 27/40; G02B 27/164; G11B 7/00; G11B 5/09; G11B 11/03

(52) U.S. Cl. .................. 250/201.5; 369/44.32; 369/47.28; 369/53.19

(58) Field of Search .................. 250/201.5; 369/53.12, 369/53.19, 44.32, 53.18, 53.23, 53.28, 47.28

(56) References Cited

U.S. PATENT DOCUMENTS 5,886,966 A * 3/1999 Ota et al. .................. 369/53.18
6,259,665 B1 * 7/2001 Nagasato .................. 369/44.3

* cited by examiner

*Primary Examiner*—Georgia Epps
*Assistant Examiner*—Alicia M. Harrington
(74) *Attorney, Agent, or Firm*—Morgan, Lewis & Bockius LLP

(57) ABSTRACT

A tilt detector and tilt detection method which are capable of detecting a tilt in a radial direction of an optical disc at a high degree of precision and being cost-effective and simple in head part construction. The tilt detector includes a light beam direction velocity output unit for outputting a signal indicative of a moving velocity of a contact point of a recording surface of an optical disc and a light beam in a direction depending on the light beam in response to a signal indicative of an operation amount of a focus actuator from a focus servo device, a circumferential velocity output unit for outputting a signal indicative of a relative tangential velocity between the light beam and the recording surface of the optical disc, and a tilt angle calculator for calculating a tilt angle of the light beam projected on the recording surface of the disc, relative to the recording surface in response to the output signal from the circumferential velocity output unit and the output signal from the light beam direction velocity output unit.

11 Claims, 4 Drawing Sheets

PRIOR ART (a)   (b)   (c)

PRIOR ART

TILT DETECTOR AND TILT DETECTION METHOD IN THE RADIAL AND TANGENTIAL DIRECTIONS

BACKGROUND OF THE INVENTION

1. Field of the Invention

The present invention relates in general to a tilt detector and tilt detection method for an optical head tilt servo device in an optical disc player.

2. Description of the Prior Art

An optical disc apparatus is generally adapted to project a small and marrow beam of light on an optical disc through an object lens to scan a fine mark (pit) on the disc so as to reproduce information recorded thereon and record new information thereon.

At this time, the surface of the optical disc may be tilted relative to a beam of light from an optical head due to a distortion of the disc, a surface vibration, etc. In this case, the beam of light from the optical head is incident on the surface of the optical disc to reproduce information recorded thereon, while being tilted relative to the disc surface, thereby making it difficult to accurately read the recorded information.

FIG. 7 shows variations in tilt of a spot of light formed on the surface of an optical disc by a beam of light, relative to the disc surface. In particular, the lower part of FIG. 7 shows the shapes of the light spot and the upper part thereof shows light intensity distributions of the spot.

In more detail, FIG. 7b shows the shape and intensity distribution of the light spot when the light beam is perpendicular to the disc surface. In this drawing, the light spot is shown to have a symmetrical shape. FIGS. 7a and 7c show the shapes and intensity distributions of the light spot when the disc surface is tilted relative to the light beam. In each of these drawings, a coma-aberration is generated in the light spot on the disc, and the light spot has an asymmetrical shape.

For the purpose of preventing the above coma-aberration, the optical disc apparatus comprises a tilt servo device for correcting a tilt of an optical axis of the optical head to maintain the optical axis perpendicular to the disc surface. The tilt servo device includes tilt detection means for detecting the amount of a tilt of a beam of light projected from the optical head relative to the disc surface.

A tilt sensor is generally used to detect a tilt amount. This tilt sensor is conventionally installed in the tilt detection means separately from an optical system which generates a beam of light for reproduction of information recorded on the optical disc. In this construction, the tilt sensor must be spaced apart from the object lens of the optical head at a certain distance in order to avoid an interference therebetween. However, the tilt sensor and the object lens of the optical head must become closer to each other to obtain a more approximate value to a tilt amount of a projected position of a light spot on the disc surface relative to the surface.

FIG. 8 is a perspective view showing an example of the construction of a head part in a conventional optical disc apparatus. A head part 102 is positioned under an optical disc 101, and an object lens 103 of an optical head and a tilt sensor 104 of tilt detection means are arranged on the upper surface of the head part 102. The tilt sensor 104 is arranged on the upper surface of the head part 102 in such a manner that a spot of light 106 formed by a beam of light 105 emitted from the object lens 103 passes therethrough and is substantially aligned therewith on a track 107 of the disc surface. Through this arrangement, the tilt sensor can approximately detect the position of the light spot 106 and the tilt amount of the disc surface.

However, in the head part with the above-mentioned construction, because the light spot and the tilt sensor are not perfectly aligned with each other, it is inevitable that a value detected by the tilt sensor is in error. This cannot guarantee a sufficient degree of precision, for example, when a high degree of tilt correction is required according to a recording densification of the disc.

Further, because the optical head and tilt detection means are provided separately, the number of components increases, resulting in an increase in cost and a complexity in the construction of the head part.

SUMMARY OF THE INVENTION

Therefore, the present invention has been made in view of the above problems, and it is an object of the present invention to provide a tilt detector and tilt detection method which are capable of detecting a tilt in a radial direction of an optical disc at a high degree of precision and being cost-effective and simple in head part construction.

In accordance with one aspect of the present invention, the above and other objects can be accomplished by the provision of a tilt detector adapted to, by measuring a velocity of a spot position on a recording surface of an optical disc at which a beam of light is condensed, in a focusing direction of the optical disc and a velocity of the spot position in a rotation direction of the optical disc, calculate an angle defined by three vectors, or a focusing direction velocity vector in the focusing direction of the optical disc, a rotation direction velocity vector perpendicular to the focusing direction of the optical disc and a resultant vector of the focusing direction velocity vector and the rotation direction velocity vector and detect a tangential tilt angle on the basis of the calculated angle, the tangential tilt angle being a tilt angle in a tangential direction of the optical disc.

In accordance with another aspect of the present invention, there is provided a tilt detector for an optical disc information recording/reproduction apparatus which includes an optical head for projecting a condensed beam of light on a recording surface of a rotating optical disc and receiving the projected beam of light reflected from the recording surface of the optical disc, a focus actuator for focusing the condensed beam of light on its projected position of the recording surface of the optical disc, and focus servo means for controlling the focus actuator, the tilt detector comprising light beam direction velocity output means for outputting a signal indicative of a moving velocity of a contact point of the recording surface of the disc and the light beam in a direction depending on the light beam in response to a signal indicative of an operation amount of the focus actuator from the focus servo means; circumferential velocity output means for outputting a signal indicative of a relative tangential velocity between the light beam and the recording surface of the optical disc; and tilt angle calculation means for calculating a tilt angle of the light beam projected on the recording surface of the disc, relative to the recording surface in response to the output signal from the circumferential velocity output means and the output signal from the light beam direction velocity output means.

In accordance with a further aspect of the present invention, there is provided a tilt detector for an optical disc information recording/reproduction apparatus which includes an optical head for projecting a condensed beam of light on a recording surface of a rotating optical disc and receiving the projected beam of light reflected from the recording surface of the optical disc, a focus actuator for focusing the condensed beam of light on its projected position of the recording surface of the optical disc, focus servo means for controlling the focus actuator, and moving means for moving the projected position of the light beam on the disc with rotation of the disc, the tilt detector comprising light beam direction velocity output means for outputting a signal indicative of a moving velocity of a contact point of the recording surface of the disc and the light beam in a direction depending on the light beam in response to a signal from a certain point in the focus servo means; timing signal generation means for generating a timing signal in response to each rotation of the disc; storage means for storing the output signal from the light beam direction velocity output means in response to the timing signal from the timing signal generation means; and tilt angle calculation means for calculating a radial tilt angle of the light beam projected on the recording surface of the disc, relative to the recording surface in response to an output signal from the storage means, the radial tilt angle being a tilt angle in a radial direction of the disc.

Preferably, the focus servo means may include subtraction means for obtaining a difference between a target focusing value and a signal indicative of a current focusing state; and a compensator for outputting a signal indicative of an operation amount of the focus actuator in response to an output signal from the subtraction means; the light beam direction velocity output means being operated in response to the output signal from the subtraction means in the focus servo means.

Alternatively, the focus servo means may include subtraction means for obtaining a difference between a target focusing value and a signal indicative of a current focusing state; and a compensator for outputting a signal indicative of an operation amount of the focus actuator in response to an output signal from the subtraction means; the light beam direction velocity output means being operated in response to the output signal from the compensator in the focus servo means.

As an alternative, the focus servo means may include subtraction means for obtaining a difference between a target focusing value and a signal indicative of a current focusing state; and a compensator for outputting a signal indicative of an operation amount of the focus actuator in response to an output signal from the subtraction means; the light beam direction velocity output means being operated in response to the signal indicative of the current focusing state in the focus servo means.

Preferably, the tilt detector may further comprise prediction means for predicting a position of the contact point of the recording surface of the disc and the light beam in the direction depending on the light beam on the basis of the tilt angle calculated by the tilt angle calculation means.

In accordance with yet another aspect of the present invention, there is provided a tilt detection method for an optical disc information recording/reproduction apparatus which includes an optical head for projecting a condensed beam of light on a recording surface of a rotating optical disc and receiving the projected beam of light reflected from the recording surface of the optical disc, a focus actuator for focusing the condensed beam of light on its projected position of the recording surface of the optical disc, and focus servo means for controlling the focus actuator, the method comprising the steps of a) outputting a light beam direction velocity signal indicative of a moving velocity of a contact point of the recording surface of the disc and the light beam in a direction depending on the light beam in response to a signal indicative of an operation amount of the focus actuator from the focus servo means; b) outputting a circumferential velocity signal indicative of a relative tangential velocity between the light beam and the recording surface of the optical disc; and c) calculating a tilt angle of the light beam projected on the recording surface of the disc, relative to the recording surface in response to the circumferential velocity signal and the light beam direction velocity signal.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF THE PREFERRED EMBODIMENTS

Figure 1:
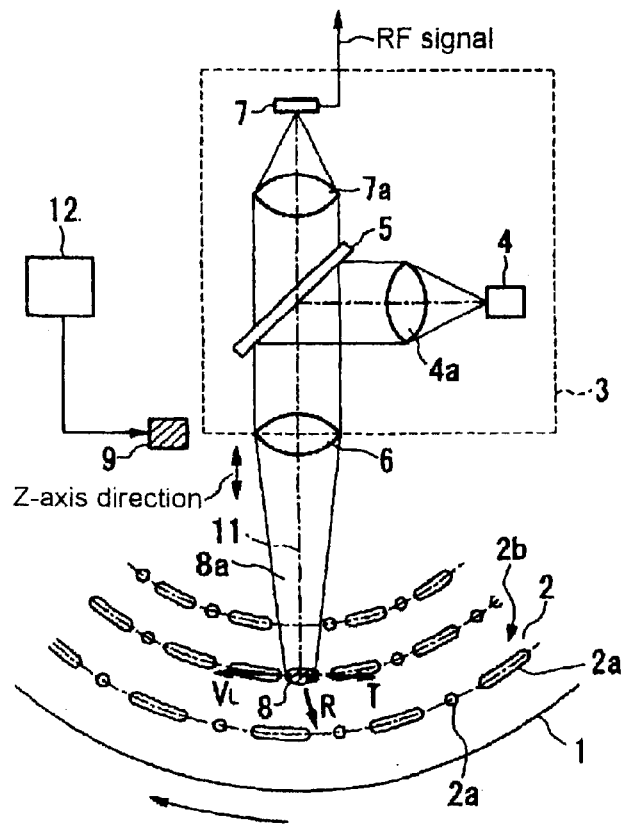
FIG. 1 is a view showing the overall construction of an information recording/reproduction apparatus to which the present invention is applied.

A description will first be given of the overall construction of an information recording/reproduction apparatus, such as an optical disc player or the like, to which the present invention is applied, with reference to FIG. 1. A pit 2a is formed on a track 2 of an optical disc 1 on which information to be reproduced is recorded. A head 3 for reproducing the recorded information is arranged at a position facing a surface on which the pit 2a is formed.

The head 3 is movable in a radial direction R of the optical disc 1 by moving means, not shown. A spot of light 8 is projected on the track 2 of the optical disc 1 by a beam of light 8a emitted from the head 3. The moving means moves a radial position of the light spot 8 with rotation of the optical disc 1, thereby enabling the spot 8 to scan the track 2.

The head 3 includes a laser diode 4 for emitting a beam of laser light, a collimating lens 4a for transforming the beam of laser light emitted from the laser diode 4 into a collimated beam of light, a beam splitter 5, an object lens 6 for receiving the collimated beam of light from the collimating lens 4a through the beam splitter 5, condensing it on a recording surface 2b of the optical disc 1 on which the pit 2a is formed and collimating a beam of light reflected from the recording surface 2b, a collimating lens 7a for condensing the reflected beam of light collimated by the object lens 6, and a sensor 7 for receiving the reflected beam of light condensed by the collimating lens 7a.

The laser diode 4 emits a beam of laser light, which is then collimated by the collimating lens 4a, reflected by the beam splitter 5 and condensed by the object lens 6, resulting in the formation of a beam of light 8a. Then, a spot of light 8 is projected on the track 2 of the optical disc 1 by the light beam 8a. This light beam is then intensity-modulated and reflected by the pit 2a on the track 2 to the beam splitter 5 via the object lens 6. Thereafter, the reflected beam of light is transmitted to the collimating lens 7a and then received by the sensor 7. The sensor 7 outputs a radio frequency (RF) signal corresponding to the received light beam, or the light beam intensity-modulated by the pit 2a.

The object lens 5 in the head 3 is driven in a parallel direction with an optical axis 11 of the light beam 8a, namely, in a Z-axis direction by a focus actuator 9, thereby causing the light spot 8 to be focused on the track 2. A control unit 12 is provided to control the focus actuator 9.

Figure 2:
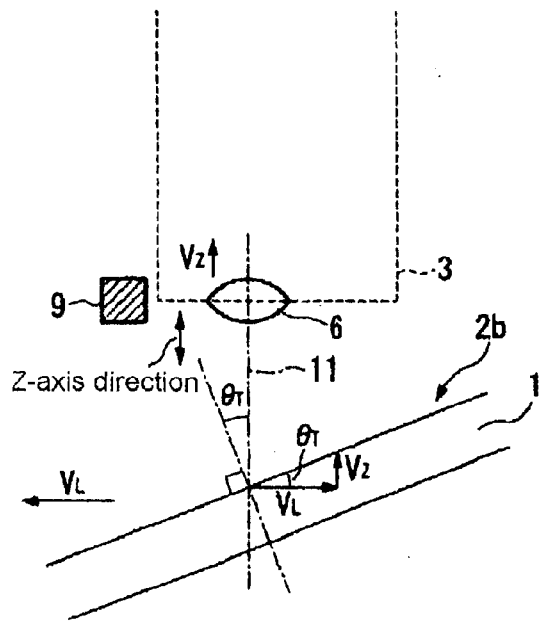
FIG. 2 is a sectional view illustrating relative positions between an optical disc and a head.

FIG. 2 is a sectional view illustrating relative positions between the optical disc 1 and the head 3. Assume that the recording surface 2b of the optical disc 1 moves in a tangential direction of the track 2 (T direction in FIG. 1) at a velocity $V_L$ with rotation of the disc 1 under the condition that it is tilted by $\theta_T$ relative to the optical axis 11 of the light beam. At this time, assuming that the recording surface 2b moves in the Z-axis direction at a velocity $V_Z$, an equation $\tan\theta = V_Z/V_L$ can be established.

Figure 3:
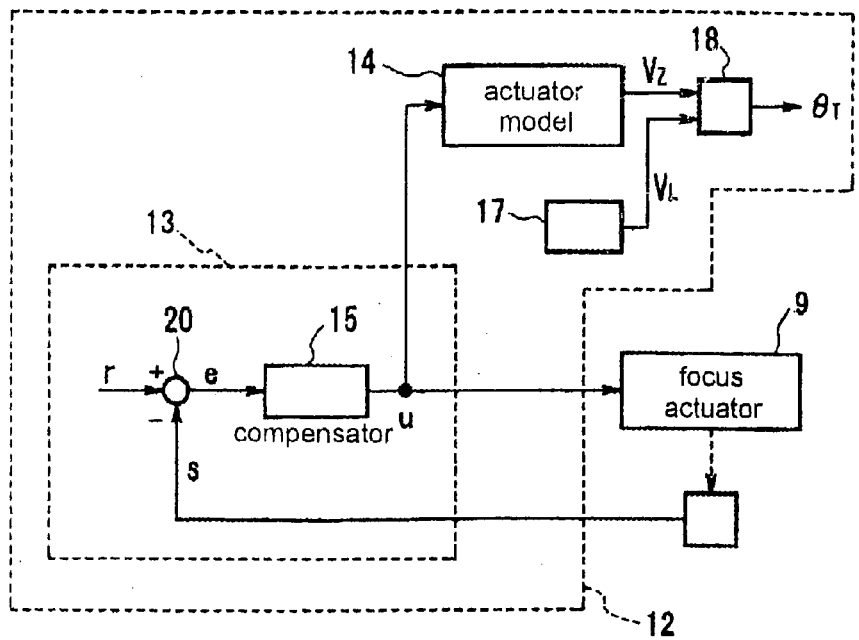
FIG. 3 is a block diagram showing the internal construction of a control unit in accordance with a first embodiment of the present invention.

FIG. 3 is a block diagram showing the internal construction of the control unit 12 in accordance with a first embodiment of the present invention. The control unit 12 includes an actuator model 14 for simulating the operation of the focus actuator 9 to focus the light spot 8, a linear velocity output unit 17 for outputting a signal indicative of a tangential velocity $V_L$ with rotation of the optical disc 1, and a tilt angle calculator 18 for calculating a tangential tilt angle $\theta_T$.

A focus servo device 13 includes a subtracter 20 for obtaining a difference between a target value r and a feedback signal s and outputting an error signal corresponding to the obtained difference, and a compensator 15 for compensating for a linearity and phase of the sensor 7.

The subtracter 20 outputs an error signal e in response to the target value r and the feedback signal s. This error signal e is applied to the compensator 15, which then provides its output signal u to the focus actuator 9 and actuator module 14. In response to the output signal u from the compensator 15, the actuator model 14 outputs a signal indicative of a Z-axial velocity $V_Z$ at a projected position of the light spot 8 on the recording surface 2b of the optical disc 1.

Namely, the actuator model 14 receives the output signal u from the compensator 15, or a drive signal (drive current) to drive the focus actuator 9, and integrates the received signal once to output the signal indicative of the velocity $V_Z$. The actuator model 14 further integrates the received signal twice to output a signal indicative of a position $P_Z$, as will be described later in detail.

The tilt angle calculator 18 calculates the tangential tilt angle $\theta_T$ in response to the signal indicative of the Z-axial velocity $V_Z$ from the actuator model 14 and the signal indicative of the tangential velocity $V_L$ from the linear velocity output unit 17.

The operation of this embodiment will hereinafter be described in detail. The subtracter 20 obtains a difference between a target value r of a predetermined focusing state and a feedback signal s indicative of the current focusing state and outputs the obtained difference as an error signal e. This error signal e is applied to the compensator 15, which then compensates for the linearity and phase of the sensor 7 in response to the error signal e. Then, the compensator 15 provides its output signal u to the focus actuator 9 and actuator model 14.

The focus actuator 9 moves the object lens 6 in the head 3 in the Z-axis direction to vary the focused state of the light spot. The variation in the focused state of the light spot signifies, for example, a variation in the amplitude of the RF signal output from the sensor 7. In this case, the variation in the amplitude of the RF signal is extracted as the feedback signal s and then fed back to the subtracter 20.

This focus servo loop operation is performed by the servo device to make the target value r and feedback signal s equal so as to focus the light spot 8.

On the other hand, the output signal u from the compensator 15, or the drive signal to drive the focus actuator 9, is also applied to the actuator model 14. In response to the applied signal u, the actuator model 14 calculates a velocity at which the focus actuator S moves the object lens 6 in the head 3 in the Z-axis direction.

The focus servo loop operation is performed to focus the light spot 8 by maintaining a distance between the object lens 6 in the head 3 and the projected position of the light spot 8 on the recording surface 2b of the disc 1 constant. Accordingly, the Z-axial moving velocity of the object lens 6 in the head 3 is equal to the Z-axial moving velocity $V_Z$ at the projected position of the light spot 8 on the optical disc 1.

The linear velocity output unit 17 outputs a signal indicative of a predetermined linear velocity of the optical disc 1, namely, a relative tangential velocity $V_L$ between the light spot 8 and the recording surface 2b of the optical disc 1.

The optical disc 1 can rotate in a constant linear velocity (CLV) mode where the linear velocity is constant, a constant angular velocity (CAV) mode where the angular velocity (rotation velocity) is constant or a zone constant angular velocity (ZCAV) mode where the angular velocity (rotation velocity) is constant on a zone basis. In any mode, the information recording/reproduction apparatus of this embodiment can reproduce information from the optical disc.

In other words, for the reproduction of information from the optical disc in the CLV mode, the linear velocity output unit 17 outputs a signal indicative of a constant linear velocity $V_L$. On the contrary, for the reproduction of information from the optical disc in the CAV mode or ZCAV mode, the linear velocity output unit 17 outputs a signal indicative of a linear velocity $V_L$ varying with a radial position of the track 2 being reproduced.

In the CLV mode, data is read and written on/from the disc under the condition that the moving velocity of the recording surface is constant relative to the head irrespective of the inner/outer circumferences of the disc. In this regard, in order to maintain the moving velocity of the recording surface relative to the head constant, the disc must rotate fast when the head scans the inner circumference of the disc and be delayed in rotation when the head scans the outer circumference of the disc. For this reason, in an apparatus for reading and writing data from/on the disc in the CLV mode, a servo mechanism must be provided in a driving part rotating the disc, for the purpose of controlling the rotation velocity of the disc according to a radial position of the head.

On the other hand, in the CAV mode, data is read and written on/from the disc under the condition that the disc rotates at a constant angular velocity (rotation velocity). Because the inner and outer circumferences of the disc are different in length, the linear velocity of the recording surface relative to the head becomes higher as the head goes to the outer circumference.

The ZCAV mode has both the characteristics of the CLV mode and CAV mode. In this ZCAV mode, the disc is partitioned into a plurality of zones from its inner circumference to outer circumference and the angular velocity (rotation velocity) is constant for each of the partitioned zones.

The tilt angle calculator 18 calculates the tilt angle $\theta_T$ in response to the signal indicative of the Z-axial velocity $V_Z$ from the actuator model 14 and the signal indicative of the linear velocity $V_L$ from the linear velocity output unit 17. Referring to FIG. 2, the relation among the tilt angle $\theta_T$, Z-axial velocity $V_Z$ and linear velocity $V_L$ can be expressed by $\theta_T = \tan^{-1}(V_Z/V_L)$.

The tilt angle $\theta_T$ can be obtained in the above manner. Then, the tilt angle correction can be performed on the basis of the obtained tilt angle $\theta_T$.

Figure 4:
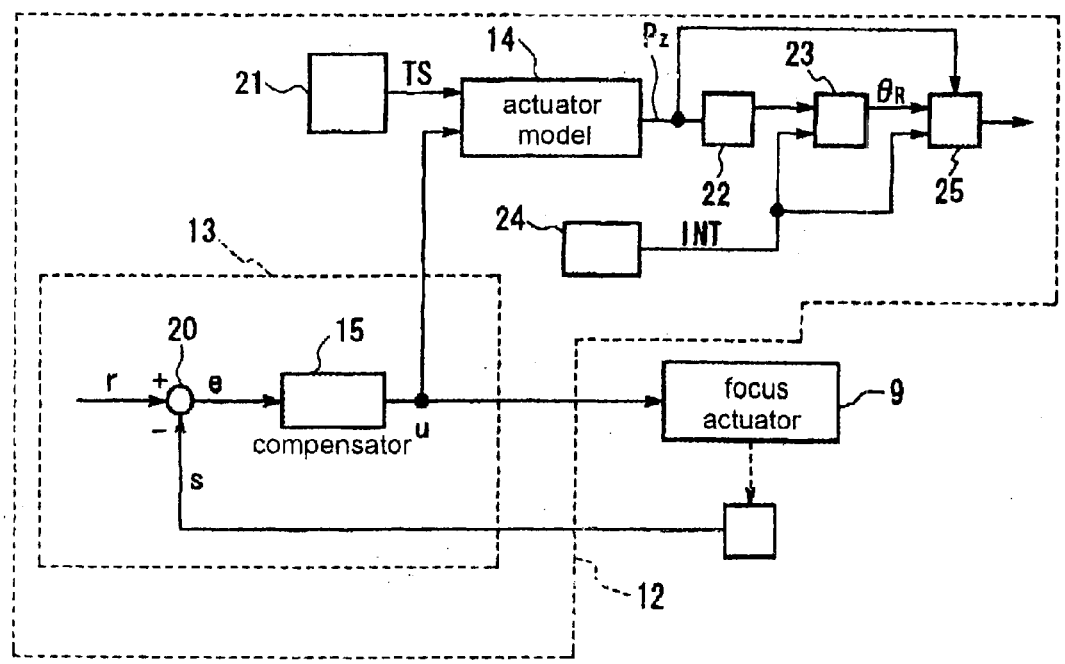
FIG. 4 is a block diagram showing the internal construction of a control unit in accordance with a second embodiment of the present invention.

FIG. 4 is a block diagram showing the internal construction of the control unit 12 in accordance with a second embodiment of the present invention. In this embodiment, the focus servo device 13 in the control unit 12 is the same in construction as the first embodiment.

The compensator 15 in the focus servo device 13 provides its output signal u to the actuator model 14, which also receives a timing signal TS from a timing signal generator 21. The actuator model 14 outputs a Z-axial positioning signal $P_Z$ indicative of a Z-axial position at the projected position of the light spot 8 on the recording surface 2b of the optical disc 1. The Z-axial positioning signal $P_Z$ from the actuator model 14 is stored in a storage unit 22 and then transferred to a tilt angle calculator 23, which also receives a track interval signal INT from a track interval output unit 24, indicating an interval between adjacent tracks 2 of the optical disc 1. The tilt angle calculator 23 calculates a radial tilt angle $\theta_R$.

Next, the operation of the second embodiment will be described. The actuator model 14 calculates the Z-axial position at the projected position of the light spot 8 on the recording surface 2b of the optical disc 1 in response to the output signal u from the compensator 15 and outputs the calculated result $P_Z$ to the storage unit 22, which then stores the result $P_Z$.

The timing signal generator 21 generates the timing signal TS for each rotation of the optical disc 1 and outputs it to the actuator model 14. Whenever the timing signal TS is generated, namely, the optical disc 1 makes one rotation, the actuator model 14 calculates the Z-axial position and outputs the calculated result $P_Z$ to the storage unit 22. As a result, a plurality of calculated results are accumulated in the storage unit 22.

The storage unit 22 transfers the accumulated, calculated results to the tilt angle calculator 23, which also receives the track interval signal INT from the track interval output unit 24. Then, the tilt angle calculator 23 calculates the radial tilt angle $\theta_R$ on the basis of the calculated results from the storage unit 22 and the track interval signal INT from the track interval output unit 24.

Figure 5:
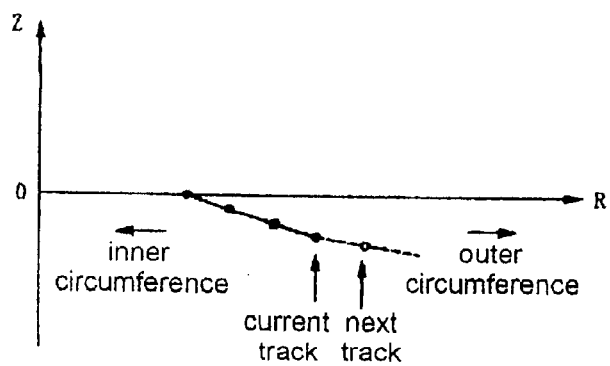
FIG. 5 is a view illustrating the operation of a predictor in FIG. 4.

The calculated radial tilt angle $\theta_R$ from the tilt angle calculator 23 is applied to a predictor 25, which also receives the Z-axial positioning signal $P_Z$ indicative of the Z-axial position of the current track 2 and the track interval signal INT. On the basis of these signals, the predictor 25 predicts a Z-axial position of the next track as shown in FIG. 5.

Figure 6:
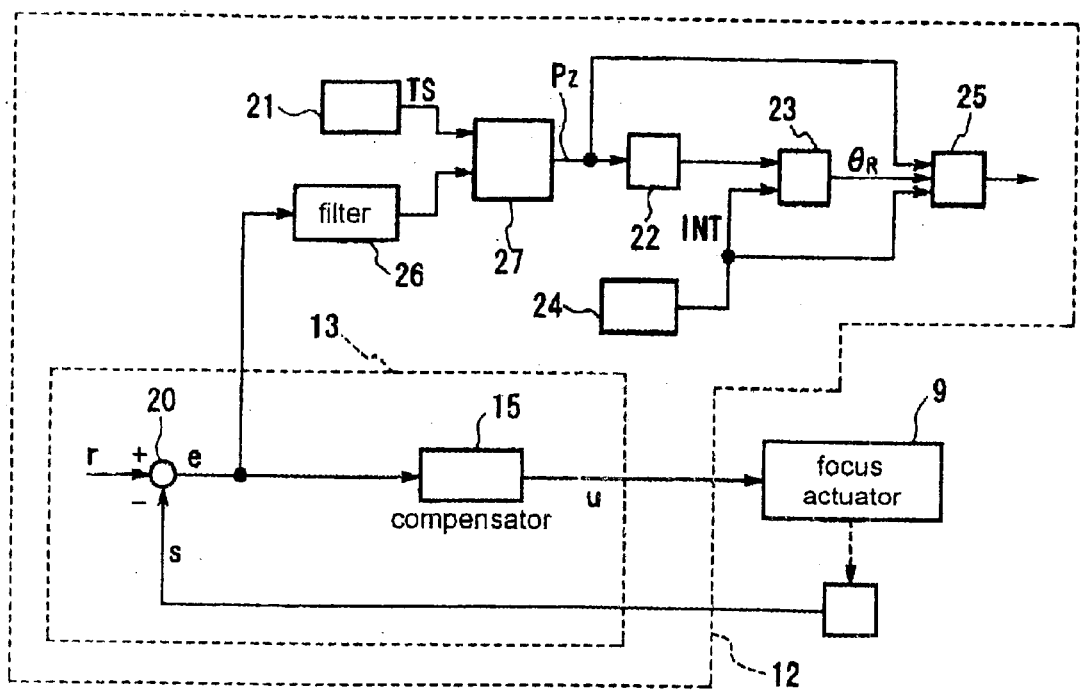
FIG. 6 is a block diagram showing the internal construction of a control unit in accordance with a third embodiment of the present invention.
Figure 7:
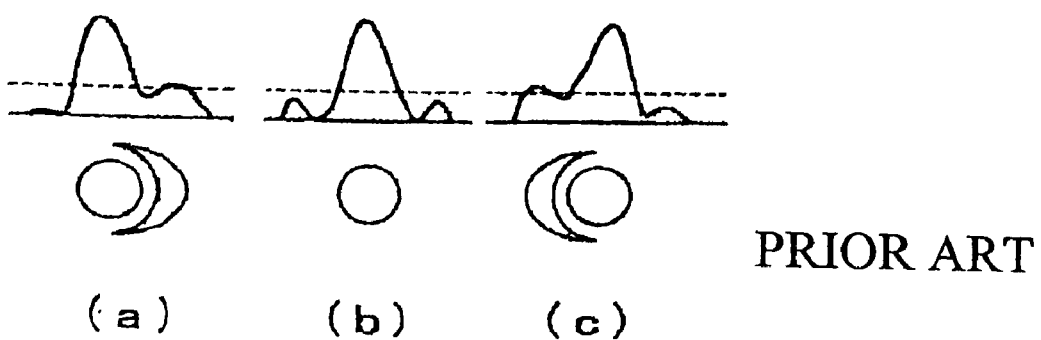
FIGS. 7a to 7c are views showing variations in tilt of a spot of light formed on the surface of an optical disc by a beam of light, relative to the disc surface.
Figure 8:
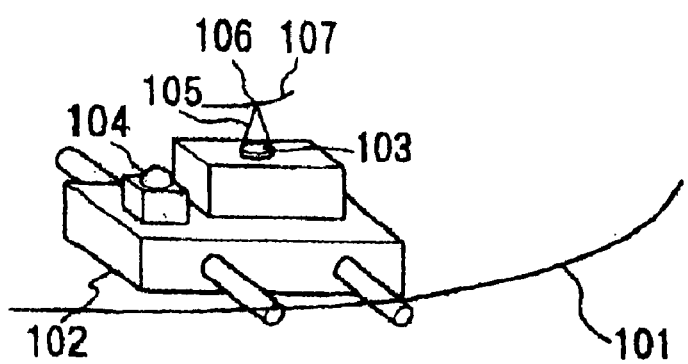
FIG. 8 is a perspective view showing an example of the construction of a head part in a conventional optical disc apparatus.

FIG. 6 is a block diagram showing the internal construction of the control unit 12 in accordance with a third embodiment of the present invention. In this embodiment, the error signal e from the subtracter 20 is transferred via a filter 26 to a Z-axial position output unit 27, which also receives the timing signal TS from the timing signal generator 21. Whenever the timing signal TS is generated, namely, the optical disc 1 makes one rotation, the Z-axial position output unit 27 outputs the Z-axial positioning signal $P_Z$ on the basis of the output of the filter 26. Except for this, the third embodiment is the same in construction and operation as the second embodiment.

As an alternative to the third embodiment, the input to the system for calculation of the tilt angle $\theta_R$, namely, the input to the filter 26 may be obtained from the feedback signal s in the focus service device 13.

As apparent from the above description, according to the present invention, light spot projection means and tilt angle detection means can constitute a single unit, and a tilt angle detection position can be perfectly matched with a projected position of a spot of light, thereby making it possible to detect a tilt angle at a high degree of precision.

Further, the implementation of the light spot projection means and tilt angle detection means as a single unit can limit the number of components and cost and make the construction of a head part simple.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A tilt detector adapted to, by measuring a velocity of a spot position on a recording surface of an optical disc at which a beam of light is condensed, in a focusing direction of said optical disc and a velocity of said spot position in a rotation direction of said optical disc, calculate an angle defined by three vectors, or a focusing direction velocity vector in said focusing direction of said optical disc, a rotation direction velocity vector perpendicular to said focusing direction of said optical disc and a resultant vector of said focusing direction velocity vector and said rotation direction velocity vector and detect a tangential tilt angle on the basis of the calculated angle, said tangential tilt angle being a tilt angle in a tangential direction of said optical disc.

2. A tilt detector for an optical disc information recording/reproduction apparatus which includes an optical head for projecting a condensed beam of light on a recording surface of a rotating optical disc and receiving the projected beam of light reflected from said recording surface of said optical disc, a focus actuator for focusing said condensed beam of light on its projected position of said recording surface of said optical disc, and focus servo means for controlling said focus actuator, said tilt detector comprising:

light beam direction velocity output means for outputting a signal indicative of a moving velocity of a contact point of said recording surface of said disc and said light beam in a direction depending on said light beam in response to a signal indicative of an operation amount of said focus actuator from said focus servo means;

circumferential velocity output means for outputting a signal indicative of a relative tangential velocity between said light beam and said recording surface of said optical disc; and tilt angle calculation means for calculating a tilt angle of said light beam projected on said recording surface of said disc, relative to said recording surface in response to the output signal from said circumferential velocity output means and the output signal from said light beam direction velocity output means.

3. A tilt detector for an optical disc information recording/reproduction apparatus which includes an optical head for projecting a condensed beam of light on a recording surface of a rotating optical disc and receiving the projected beam of light reflected from said recording surface of said optical disc, a focus actuator for focusing said condensed beam of light on its projected position of said recording surface of said optical disc, focus servo means for controlling said focus actuator, and moving means for moving the projected position of said light beam on said disc with rotation of said disc, said tilt detector comprising:

light beam direction velocity output means for outputting a signal indicative of a moving velocity of a contact point of said recording surface of said disc and said light beam in a direction depending on said light beam in response to a signal from a certain point in said focus servo means;

timing signal generation means for generating a timing signal in response to each rotation of said disc;

storage means for storing the output signal from said light beam direction velocity output means in response to said timing signal from said timing signal generation means; and tilt angle calculation means for calculating a radial tilt angle of said light beam projected on said recording surface of said disc, relative to said recording surface in response to an output signal from said storage means, said radial tilt angle being a tilt angle in a radial direction of said disc.

4. The tilt detector as set forth in claim 3, further comprising prediction means for predicting a position of said contact point of said recording surface of said disc and said light beam in said direction depending on said light beam on the basis of said tilt angle calculated by said tilt angle calculation means.

5. The tilt detector as set forth in claim 3, wherein said focus servo means includes:

subtraction means for obtaining a difference between a target focusing value and a signal indicative of a current focusing state; and a compensator for outputting a signal indicative of an operation amount of said focus actuator in response to an output signal from said subtraction means;

said light beam direction velocity output means being operated in response to the output signal from said subtraction means in said focus servo means.

6. The tilt detector as set forth in claim 5, further comprising prediction means for predicting a position of said contact point of said recording surface of said disc and said light beam in said direction depending on said light beam on the basis of said tilt angle calculated by said tilt angle calculation means.

7. The tilt detector as set forth in claim 3, wherein said focus servo means includes:

subtraction means for obtaining a difference between a target focusing value and a signal indicative of a current focusing state; and a compensator for outputting a signal indicative of an operation amount of said focus actuator in response to an output signal from said subtraction means;

said light beam direction velocity output means being operated in response to the output signal from said compensator in said focus servo means.

8. The tilt detector as set forth in claim 7, further comprising prediction means for predicting a position of said contact point of said recording surface of said disc and said light beam in said direction depending on said light beam on the basis of said tilt angle calculated by said tilt angle calculation means.

9. The tilt detector as set forth in claim 3, wherein said focus servo means includes:

subtraction means for obtaining a difference between a target focusing value and a signal indicative of a current focusing state; and a compensator for outputting a signal indicative of an operation amount of said focus actuator in response to an output signal from said subtraction means;

said light beam direction velocity output means being operated in response to said signal indicative of the current focusing state in said focus servo means.

10. The tilt detector as set forth in claim 9, further comprising prediction means for predicting a position of said contact point of said recording surface of said disc and said light beam in said direction depending on said light beam on the basis of said tilt angle calculated by said tilt angle calculation means.

11. A tilt detection method for an optical disc information recording/reproduction apparatus which includes an optical head for projecting a condensed beam of light on a recording surface of a rotating optical disc and receiving the projected beam of light reflected from said recording surface of said optical disc, a focus actuator for focusing said condensed beam of light on its projected position of said recording surface of said optical disc, and focus serve means for controlling said focus actuator, said method comprising the steps of:

a) outputting a light beam direction velocity signal indicative of a moving velocity of a contact point of said recording surface of said disc and said light beam in a direction depending on said light beam in response to a signal indicative of an operation amount of said focus actuator from said focus servo means;

b) outputting a circumferential velocity signal indicative of a relative tangential velocity between said light beam and said recording surface of said optical disc; and c) calculating a tilt angle of said light beam projected on said recording surface of said disc, relative to said recording surface in response to said circumferential velocity signal and said light beam direction velocity signal.

* * * * *